US00RE37097E

(19) United States
(12) Reissued Patent
Daigle et al.

(10) Patent Number: US RE37,097 E
(45) Date of Reissued Patent: Mar. 20, 2001

(54) METHOD FOR SPLICING DRIP IRRIGATION HOSES USING SPLICING MEANS INTERNAL TO THE HOSES

(75) Inventors: Harold Daigle; Scott Avenell, both of San Diego, CA (US)

(73) Assignee: T-Systems, International, San Diego, CA (US)

(21) Appl. No.: 09/426,467

(22) Filed: Oct. 25, 1999

Related U.S. Patent Documents

Reissue of:
(64) Patent No.: 5,690,769
Issued: Nov. 25, 1997
Appl. No.: 08/517,600
Filed: Aug. 21, 1995

(51) Int. Cl.[7] ..... B65H 69/02
(52) U.S. Cl. ..... 156/158; 156/289; 156/304.2; 156/304.3; 156/304.6; 156/322; 156/159; 156/259
(58) Field of Search ..... 156/158, 159, 156/259, 289, 304.2, 304.3, 304.6, 322

(56) References Cited

U.S. PATENT DOCUMENTS

| | | | |
|---|---|---|---|
| 3,635,504 | 1/1972 | Borden et al. | 285/260 |
| 3,666,586 | 5/1972 | Lacey | 156/98 |
| 3,998,682 | 12/1976 | Harmsen | 156/158 |
| 4,032,176 | 6/1977 | Tabary | 285/18 |
| 4,092,193 | 5/1978 | Brooks | 156/83 |
| 4,204,897 | 5/1980 | Bartell et al. | 156/155 |
| 4,215,516 | 8/1980 | Huschle et al. | 51/399 |
| 4,610,742 | 9/1986 | Rop et al. | 156/158 |
| 4,630,846 | 12/1986 | Nishino et al. | 285/21 |
| 4,736,775 | 4/1988 | Oxley | 138/118.1 |
| 4,801,349 | 1/1989 | Dommer et al. | 156/503 |
| 4,906,313 | 3/1990 | Hill | 156/158 |
| 5,141,580 | 8/1992 | Dufour et al. | 156/158 |
| 5,175,032 | 12/1992 | Steele et al. | 428/34.9 |

FOREIGN PATENT DOCUMENTS

| | | | |
|---|---|---|---|
| 116019 | 8/1984 | (EP) | 156/158 |

*Primary Examiner*—Mark A. Osele
(74) *Attorney, Agent, or Firm*—Christie, Parker & Hale, LLP

(57) ABSTRACT

An embodiment of the present invention is a method for splicing together a pair of drop irrigation hoses using splicing means internal to the pair of hoses. The pair of hoses are joined in axial alignment to form a junction with the splicing means interposed internal to each hose. A splicing means is bonded to an inside surface of each hose to fashion the pair of hoses and splicing means into a unitary structure using means for fixing the splicing means to another surface. A seal is formed using means for sealing circumferentially at the junction to create a water-tight seal.

43 Claims, 8 Drawing Sheets

METHOD FOR SPLICING DRIP IRRIGATION HOSES USING SPLICING MEANS INTERNAL TO THE HOSES

Matter enclosed in heavy brackets [ ] appears in the original patent but forms no part of this reissue specification; matter printed in italics indicates the additions made by reissue.

FIELD OF THE INVENTION

The present invention relates to a method for splicing together a pair of drop irrigation hoses and, more specifically, a method for splicing together a pair of drop irrigation hoses using splicing means internal to the pair of hoses.

BACKGROUND OF THE INVENTION

Drip irrigation technology is employed throughout the world for use in the agricultural industry. Hoses for performing drop irrigation are typically installed in fields, orchards, vineyards, nurseries, greenhouses, or anywhere in which drip precipitation is desired, both above and below the ground. An exemplary example of a plastic drip irrigation hose is T-TAPE TSX, manufactured by T-Systems International, Inc., San Diego, Calif.

Drip irrigation hose can generally be classified into two types: hose having discrete emitters and hose having continuous, integral emitters. An example of a drip irrigation hose having discrete emitters is shown in U.S. Pat. No. 4,850,531. An example of a drop irrigation hose having continuous, integral emitters is shown in U.S. Pat. No. 4,247,051.

In the use of all types of drip irrigation hoses, it is commonly necessary to splice together a pair of hoses. Several techniques are employed to splice irrigation hoses together. One technique comprises splicing hoses together by using wire ties to secure a piece of rigid tubing inserted inside both hoses. A wire tie is wrapped several times around each hose over the section of the hose that overlaps the rigid tubing and the wire tie is twisted to form a water-tight seal. Problems with this technique are that the rigid tubing causes a substantial deformity in the hoses at the splice and the wire ties may work their way loose over time, thereby destroying the integrity of the water-tight seal.

Another technique is splicing together drip irrigation hoses using a screw-on connector. An internally threaded connector is fit over the outside of each of the irrigation hoses. An externally threaded cylindrical insert is then inserted into both ends of the hoses. The threads on each end of the insert are diametrically oriented. The outer connectors are threaded onto the insert with the irrigation hoses frictionally and engageably squeezed between each of the outer connectors and the insert to form a water-tight seal. A problem with this technique is that a substantial deformity is formed in the hoses at the splice.

Therefore, what is needed is a technique for splicing together drip irrigation hoses which maintains a permanent water-tight seal and does not result in a substantial deformity at the splice.

SUMMARY OF THE INVENTION

The present invention enables the above problems to be overcome by providing a method for splicing drip irrigation hoses using splicing means internal to the hoses. The splicing means only bonds with one inside surface of the irrigation hoses and does not affect any other inside surface of the hoses.

An embodiment of the present invention is a method for splicing together a pair of drip irrigation hoses using splicing means internal to the pair of hoses. The pair of hoses are joined in axial alignment to form a junction with the splicing means interposed internal to each hose. The splicing means is bonded to an inside surface of each hose to fashion the pair of hoses and splicing means into a unitary structure using means for fusing the splicing means to another surface. A seal is formed using means for sealing circumferential at the junction to create a water-tight seal.

An embodiment of the present invention is also a method for splicing together a pair of drop irrigation hoses using a splicing insert internal to the pair of hoses. Each hose is preheated. Approximately half of the splicing insert is inserted into one hose. The pair of hoses are connected by inserting the other half of the splicing insert into the other hose, the pair of hoses being axially aligned and forming a junction. The pair of hoses are heated around the junction to fuse the splicing insert to an inside surface of each hose. The junction is fused circumferentially to create a primary water-tight seal.

Still other embodiments of the present invention will become readily apparent to those skilled in the art from the following detailed description, wherein as shown and described only embodiments of the invention by way of illustration of the best modes are contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DETAILED DESCRIPTION

The present invention relates to a method for splicing drip irrigation hoses using splicing means internal to the hoses. An exemplary drip irrigation hose upon which the present method can be practiced is the aforementioned plastic drip irrigation hose manufactured by T-Systems International, Inc.

Figure 1:
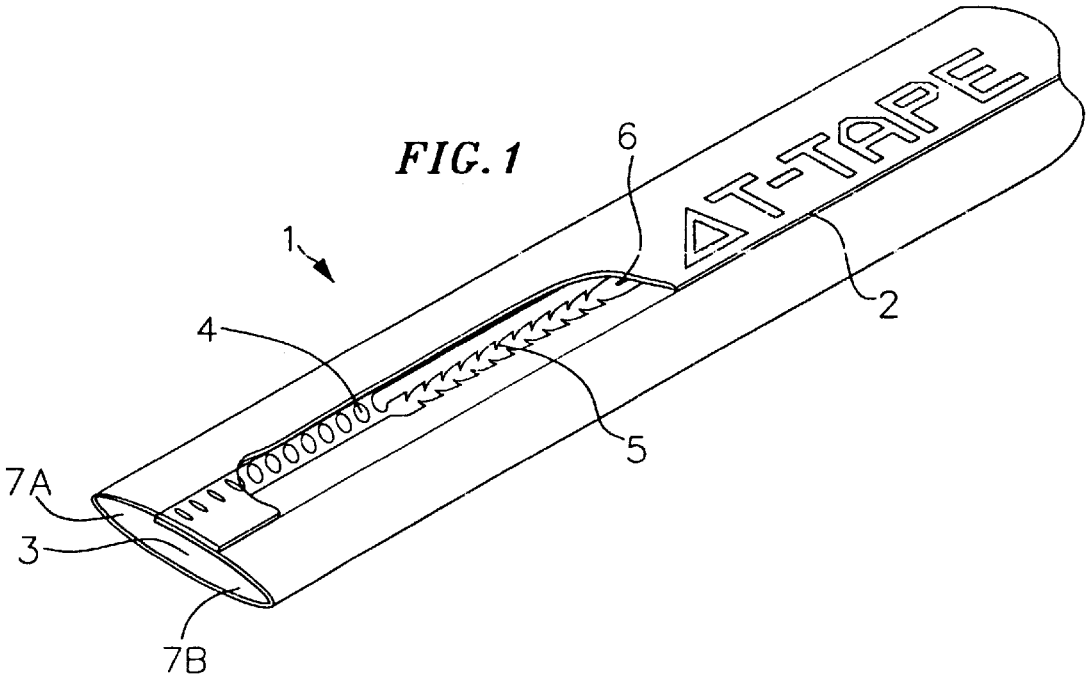
FIG. 1 is a partial cutaway view of an exemplary drip irrigation hose.

A view depicting a drip irrigation hose to which the present invention relates is shown in FIG. 1. The drip irrigation hose 1 is constructed of an elongated strip of plastic film, preferably ranging in thickness from 4 mil to 15 mil, although the present method will work with other thicknesses of plastic film. The strip of plastic film is folded longitudinally to form overlapping margins. The resulting hose 1 has a generally flattened ovoidal shape with upper and lower inside surfaces 7a and 7b. The hose 1 also forms a supply tube 3 on the inside and parallel longitudinal seals that connect the overlapping margins to define a longitudinal track 2 along an upper wall of the hose.

In the exemplary hose, a series of self contained, mutually sealed sections are defined longitudinally within the overlapping margins. Each sealed section comprises a series of inlets, channels and a slit outlet followed by a seal to prevent water from flowing between adjacent sealed sections. Each section operates independently of the other sections. Inlets 4 are defined longitudinally along the inward facing side of the track 2 to permit water flow from supply tube 3 to track 2. Turbulent flow regulating channels 5 extend longitudinally along track 2 from the inlets 4 to a slit outlet 6 through which water passes to the external surroundings to effect irrigation. The series of inlets 4, channels 5, and slit outlet 6 is repeated along the longitudinal length of the hose 1.

Figure 2:
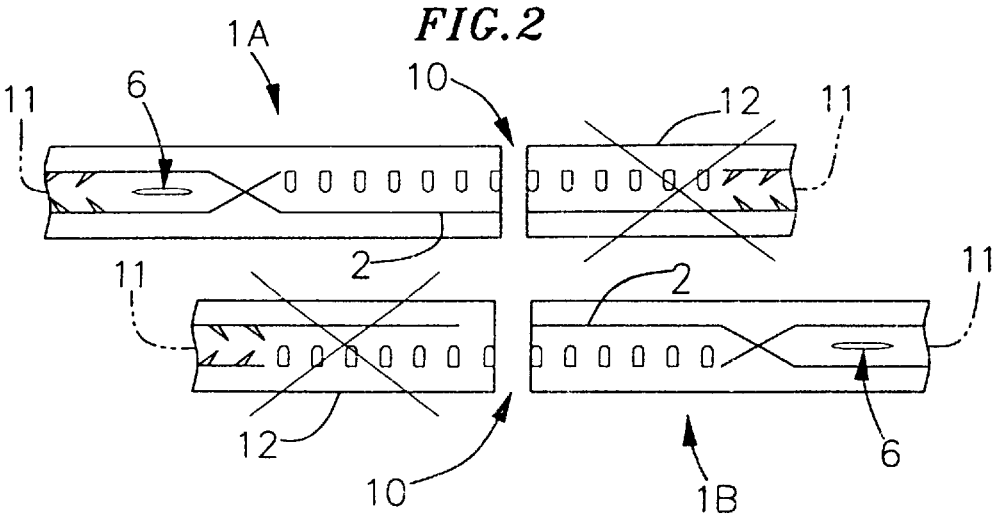
FIG. 2 is a plan view depicting preparation of a pair of hoses to be spliced.

A plan view depicting preparation of a pair of hoses to be spliced is shown in FIG. 2. The cut 10 is made in hoses 1a and 1b preferably at an angle perpendicular to a longitudinal axis 11 or each hose and at a location centered between a pair of slit outlets 6. Each section of excess hose 12 should be discarded. Although each track 2 is shown oriented opposite to the other hose's track, the track orientation is immaterial to the present invention and the respective tracks can either be aligned or on opposite sides.

Figure 3:
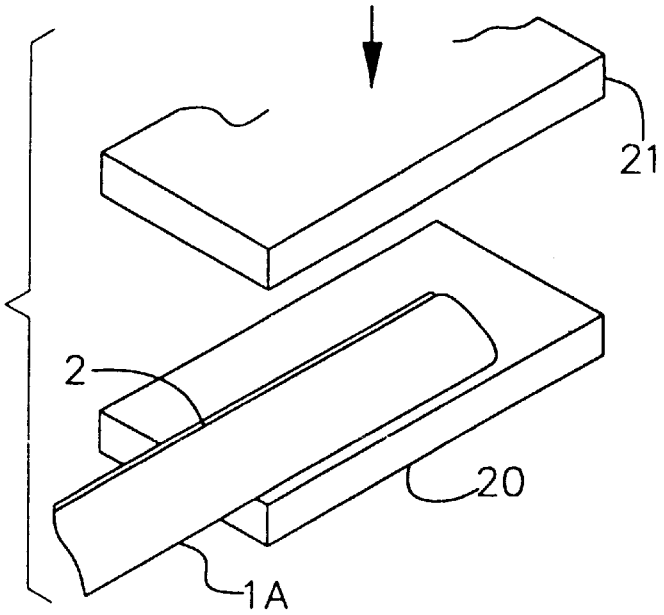
FIG. 3 is a perspective view depicting preheating a hose.

Prior to being spliced, each hose is preferably preheated, as shown for hose 1a in FIG. 3. Preheating serves several purposes. First, preheating increases the pliability of the plastic film that makes up each hose. Second, preheating facilitates bonding by decreasing the difference in the ambient temperature of the plastic film versus the melting point of the splicing insert that is bonded internally to each hose (described below). Preheating normalizes the hoses' ambient temperatures and the subsequent application of heat by a heating means (also described below) is directed solely to forming a perfect bond between the hoses and the splicing insert. This is particularly important when hoses of thicker mils, such as 15 mil, are located in a cold climate and need to be spliced. Without preheating, the heating means must first heat up the plastic film and that heat energy is wasted, rather than being directed to fusing the splicing insert.

Third, preheating is required to crease the offsets formed in each of the hoses when thicker mils, such as 15 mil, are used (described below as a further embodiment). Finally, although preheating is not required for all mil thicknesses and ambient temperatures, it is useful to perform preheating nevertheless for the sake of consistency in performing the splicing process.

To preheat, hose 1a is placed on a lower heating element 20 with track 2 facing upwards. An upper stamp 21, preferably covered and padded, is moved downwardly to compress hose 1 which should remain in a compressed and heated state for approximately 3 seconds. The preheating is repeated for hose 1b.

Figure 4:
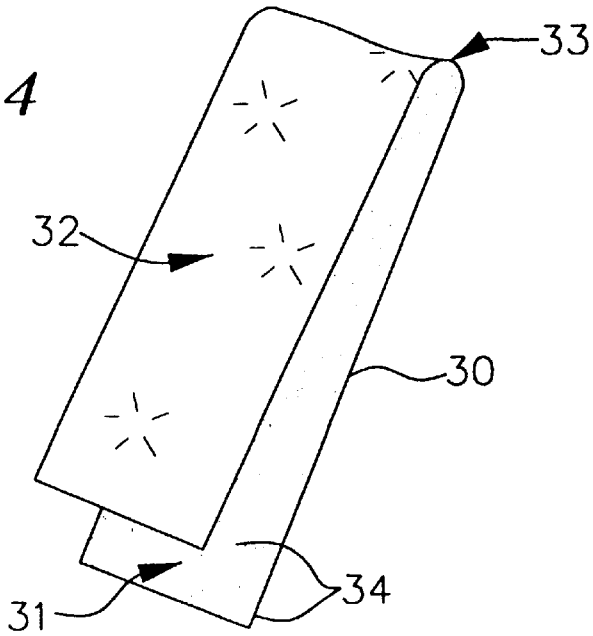
FIG. 4 is a perspective view depicting a splicing insert, shown preferably folded slightly offset from center.

Splicing means for splicing together a pair of hoses 1a and 1b is shown in FIG. 4. A splicing insert 30 is sized to fit internal to the hoses affixed to an inside surface of each hose on a wall opposite track 2. Preferably, splicing insert 30 has a bonding surface 31 made up of co-polymer polyethylene and an opposite non-bonding surface 32 made up of polyester. When heat and pressure are applied to insert 30, bonding surface 31 fuses to lower inside surface 7b of hoses 1a and 1b while non-bonding surface 32 does not fuse. This allows hoses 1a and 1b to be spliced with splicing means internal to the hoses that does not constrict supply tube 3. Water therefore flows unimpeded through the splice. Other materials having similar bonding characteristics could be used in addition to polyester/co-polymer polyethylene insert 30.

Preferably, splicing insert 30 is substantially equal in width to the transverse inner dimension of the hoses. Splicing insert 30 must be at least as long as the primary seal and, if a pair of secondary seals are used, as long as the primary seal and secondary seals combined. In a preferred embodiment, each seal is ⅜" long. The primary seal and secondary seals are described below. Ideally, the splicing insert 30 should be long enough so that there is a slight gap between the primary seal and each of the secondary seals with a slight extension on both outside ends of the secondary seals. The gaps and extensions are preferable so that the hoses do not seal themselves off during the steps of forming the secondary seals.

To facilitate the placement of splicing insert 30 into the hose 1 at the proper depth, the splicing insert 30 preferably folded to form transverse crease 33 and slight offset 34 from center with the bonding surface 31 on the inside. The offset 34 is formed along the transverse ends of the splicing insert 30, preferably offset by about 3⁄16".

Figure 5:
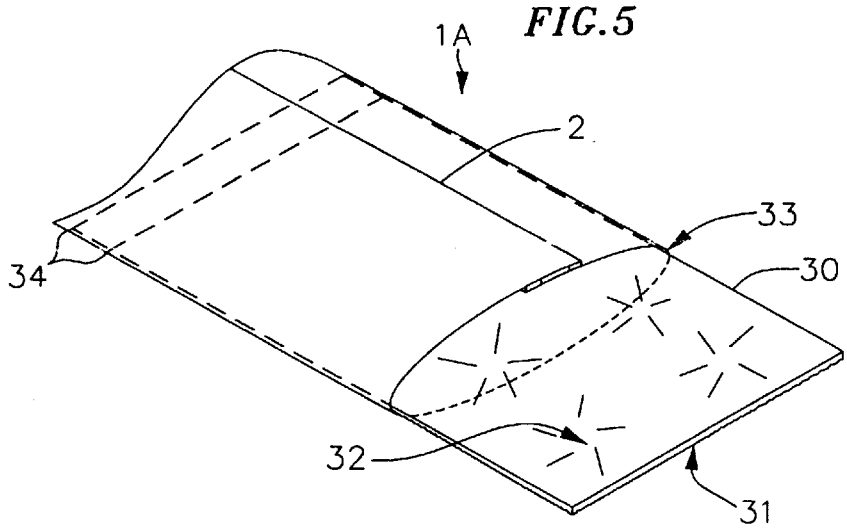
FIG. 5 is a perspective view depicting a splicing insert inserted into one end of a hose.

The splicing insert 30 is next unfolded and inserted into hose 1a with the bonding surface 31 facing downwards towards an inside hose surface on a wall opposite track 2. Additionally, the end of the splicing insert 30 defining offset 34 is inserted into hose 1a until transverse crease 33 is aligned with the end of hose 1a, as shown in FIG. 5. The transverse crease 33 serves as a measuring guide and ensures that the splicing insert 30 is properly centered when the other hose is positioned over it.

Figure 6:
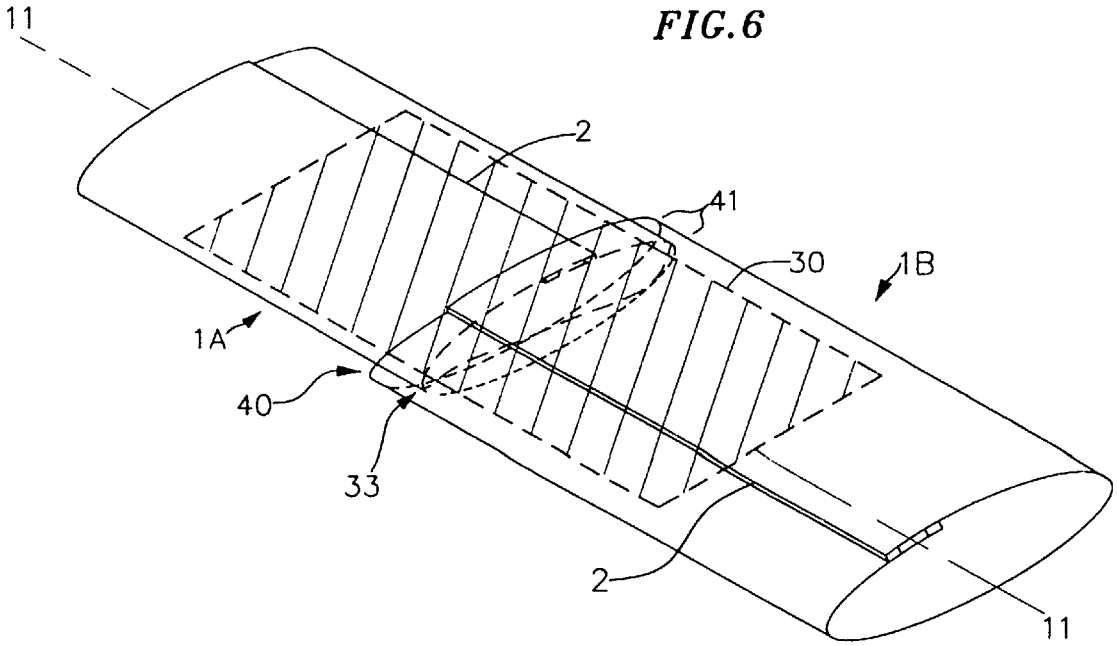
FIG. 6 is a perspective view of a connected pair of hoses with the splicing insert interposed internal to each hose.

The pair of hoses 1a and 1b are connected by inserting the other half of the splicing insert 30 into hose 1b, as shown in FIG. 6. The pair of hoses 1a and 1b must be aligned along the longitudinal axis 11 of hoses 1a and 1b and positioned to form an overlapping junction 40. It is critical that the pair of hoses be in axial alignment to ensure an optimal splice and that no creases are formed in the hose material at any point around the junction 40. Preferably, the junction 40 forms an overlap 41 of substantially 3⁄16", that is, overlap 41 is equal in length to offset 34 so that equal lengths of insert 30 contact both hoses 1a and 1b. However, junction 40 could also be formed by butting together the ends of the pair of hoses or by adding material to bridge a gap formed between the respective hose ends. It is essential that a uniform overlap 41 be formed throughout the junction 40 of hoses 1a and 1b.

Optionally, junction 40 is manually pressed flat without heating and the connected hoses are allowed to rebound to their original ovoidal shapes. The overlap 41 is then checked for circumferential uniformity.

Figure 7:
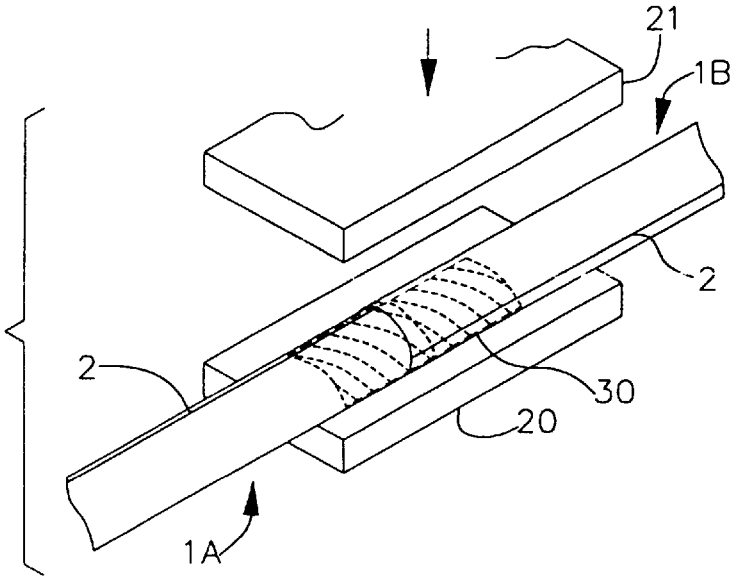
FIG. 7 is a perspective view depicting bonding the splicing insert to the inside surfaces of the pair of hoses.

Insert 30 is next fused to lower inside surface 7b of connected hoses 1a and 1b by heating the connected hoses between lower heating element 20 and upper stamp 21, as shown in FIG. 7. The connected hoses are placed on the lower heating element 20 with track 2 facing upwards. The upper stamp 21 is moved downwardly to compress the connected hoses which remains in a compressed and heated state long enough for insert 30 to properly bond to both hoses 1a and 1b. The amount of time needed varies according to the mil thickness and ambient temperatures, but is typically between 5 to 15 seconds. The combination of heat and pressure cause insert 30 to bond the inside surfaces of hoses 1a and 1b into a unitary structure with insert 30. The splicing insert 30 becomes permanently affixed to each hose 1.

Figure 8:
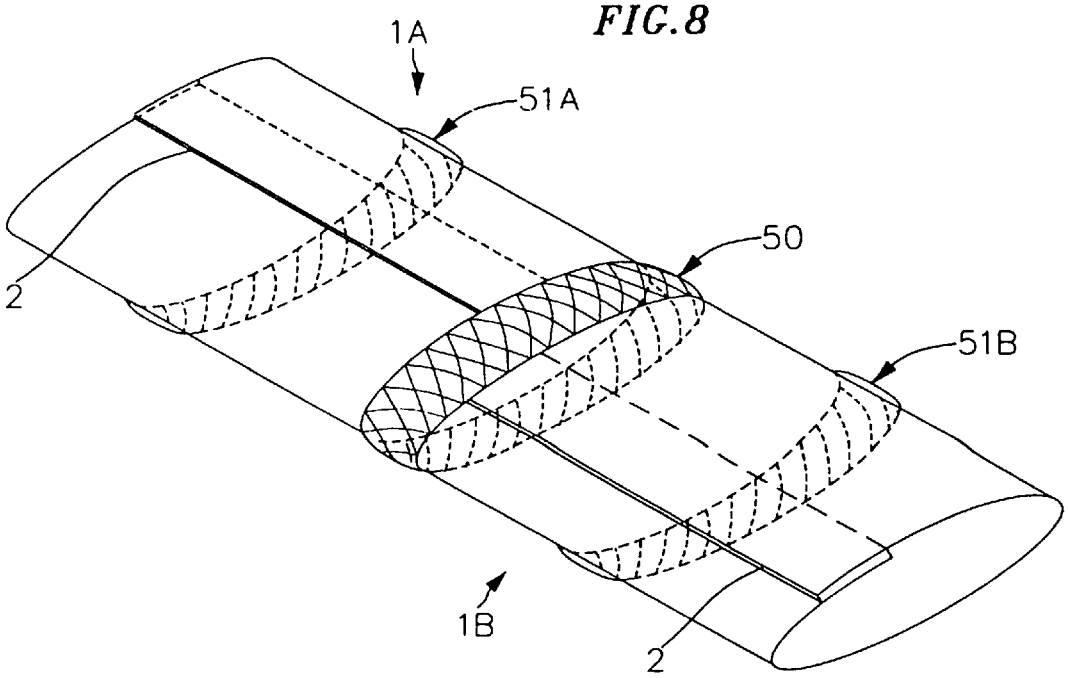
FIG. 8 is a perspective view depicting a splice formed according to an embodiment of the present invention.

Once insert 30 is fused to lower inside surface 7b of hoses 1a and 1b, a water-tight splice must be created. Thus, water-tight primary seal 50 is formed using thermal impulse heat sealing, as shown in FIG. 8. Thermal impulse heat sealing is a process of welding thermal plastic films in which the films are clamped by a pair of jaws, heated to their welding temperature by a short powerful impulse and cooled while still under pressure. A typical thermal impulse heat sealer comprises a pair of jaws forming fusing surfaces, one of which is a resilient pressure jaw and the other a heater jaw containing a heating element in the form of a metal strip of very low heat capacity. After tightly closing the jaws over the hoses, an electrical impulse is applied to the heater jaw for a short period, generally less than a second instantaneously heating the plastic films making up the hoses to their welding temperature. After a short time sufficient to allow the weld to cool under pressure and for the splice to develop satisfactory strength, the jaws are opened and the welded hoses removed.

Figure 9A:
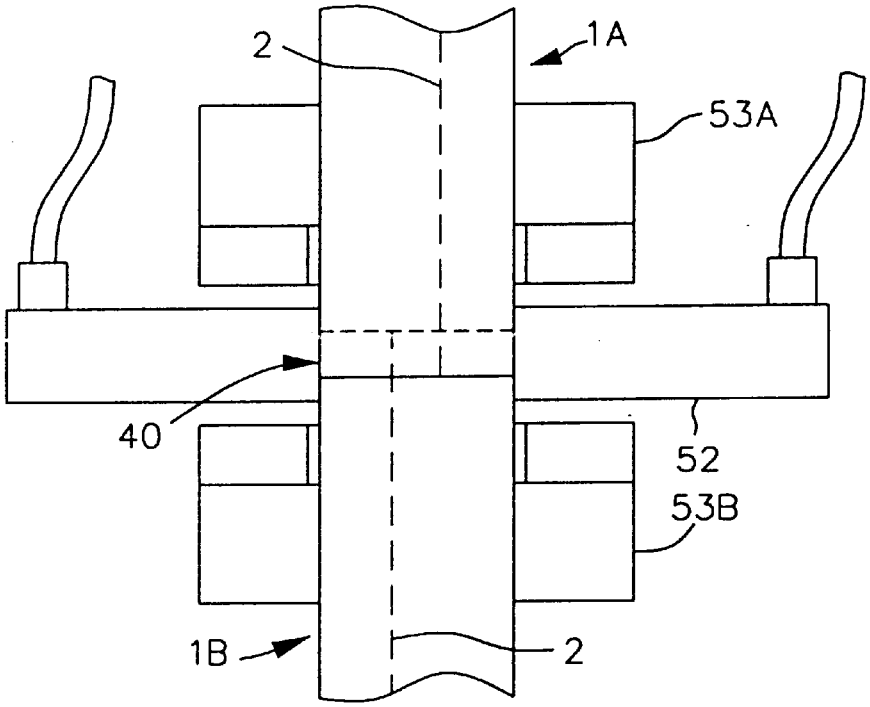
FIG. 9A is a plan view depicting forming a primary seal on a track side of a junction.
Figure 9B:
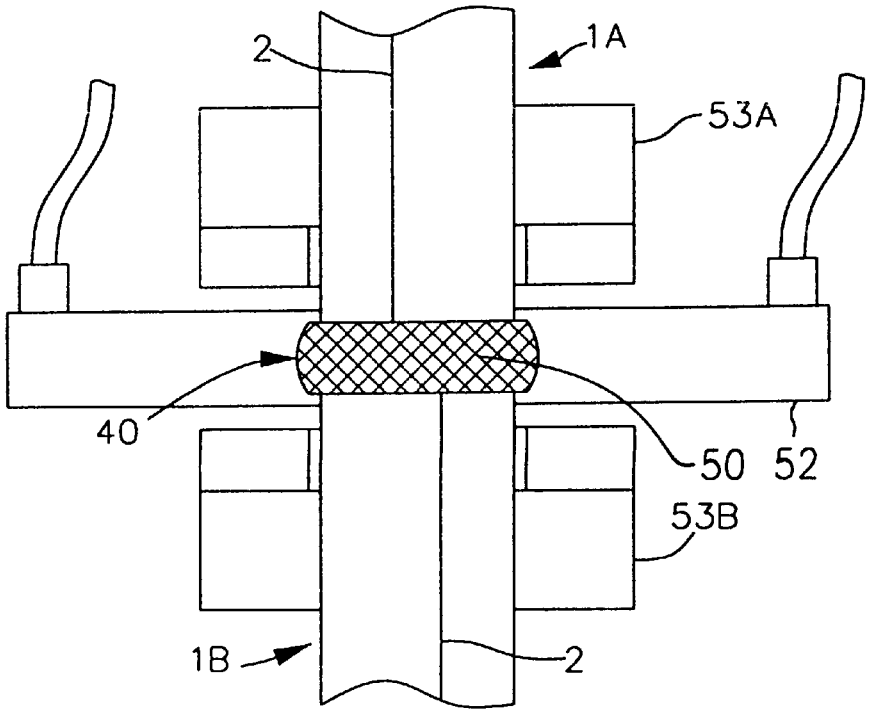
FIG. 9B is a plan view depicting forming a primary seal on an underside of a junction.

To form a water-tight primary seal 50, the overlapping junction 40 is fused circumferentially to create primary seal 50 by melting the pair of hose ends together. The junction 40 is placed on a lower fusing surface 52 with track 2 facing downwards and centered on junction 40, as shown in FIG. 9A so that the first half of a primary seal is formed on the track side of the junction 40. To ensure that the connected pair of hoses 1a and 1b remains perpendicular to the lower fusing surface 52, the hoses 1a and 1b are placed in horseshoe guides 53a and 53b. An upper resilient pressure element (not shown) is moved downwardly to compress hose 1. The compressed hoses are heated for approximately 3 seconds and remain in a compressed state for an additional 17 seconds. Thus, the entire thermal impulse heat sealing procedure takes approximately 20 seconds. The connected hoses are turned over and the fusing step is repeated, as shown in FIG. 9B so that the second half of a primary seal is formed on the underside of the junction 40.

Optionally, a pair of secondary seals 51a and 51b parallel to either side of the primary seal 50 on an underside surface of hoses 1a and 1b near the ends of splicing insert 30 are formed, as also shown in FIG. 8. The secondary seals 51a and 51b only seal the splicing insert 30 to lower inside surface 7b of hoses 1a and 1b and do not affect the other inside surfaces.

The purpose of the secondary seals 51a and 51b is to ensure that the splicing insert 30 remains permanently affixed to the inside surface of each hose 1 and is generally only required for heavier plastic films of approximately 10 mil to 15 mil in thickness. Thus, the secondary seals 51a and 51b are precautionary measures for thicker mil plastic films to ensure that the splicing insert 30 stays sealed by further fusing the ends of the splicing insert 30 to hoses 1a and 1b.

Figure 9C:
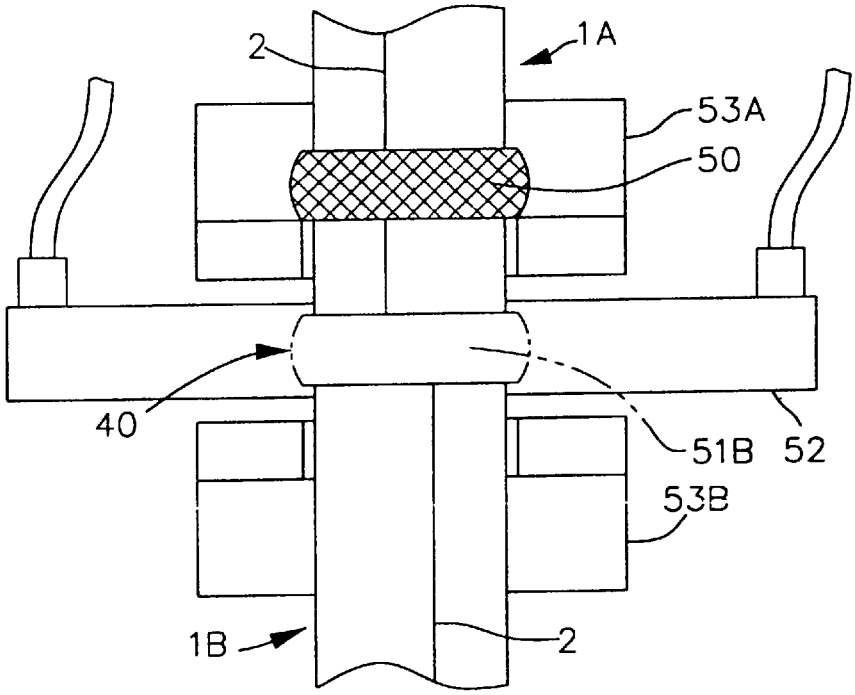
FIG. 9C is a plan view depicting forming a first secondary seal on an underside of a junction.
Figure 9D:
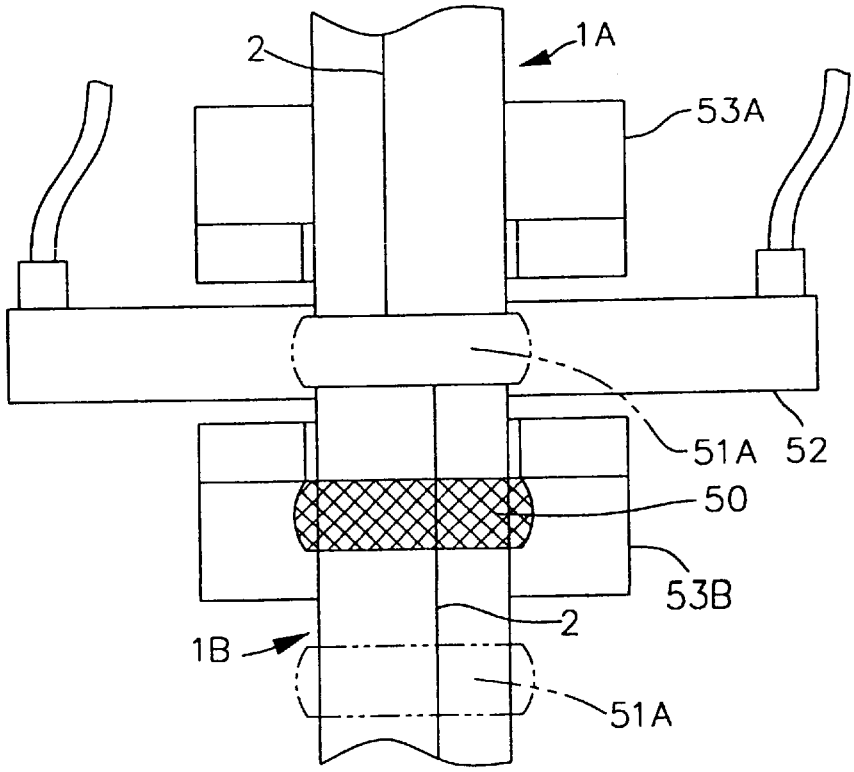
FIG. 9D is a plan view depicting forming a second secondary seal on an underside of a junction.

A similar procedure for forming the primary seal 50 is used for forming secondary seals 51a and 51b. First, hose 1b is placed on the lower fusing surface 52 parallel to the primary seal with track 2 facing upwards and the lower fusing surface 52 located near the end of splicing insert 30, as shown in FIG. 9C. To ensure that the connected pair of hoses 1a and 1b remains perpendicular to the lower fusing surface 52, the hoses 1a and 1b are placed in horseshoe guides 53a and 53b. An upper resilient pressure element (not shown) is moved downwardly to compress hose 1b. The compressed hoses are heated for approximately 3 seconds and remain in a compressed state for an additional 17 seconds. Second, hose 1a is placed on the lower fusing surface 52 parallel to the primary seal with track 2 facing upwards and the lower fusing surface 52 near the other end of splicing insert 30, as shown in FIG. 9D. An upper resilient pressure element (not shown) is moved downwardly to compress hose 1a. The compressed hoses are heated for approximately 3 seconds and remain in a compressed state for an additional 17 seconds. To ensure that the connected pair of hoses 1a and 1b remains perpendicular to the lower fusing surface 52, the hoses 1a and 1b are placed in horseshoe guides 53a and 53b.

Figure 10A:
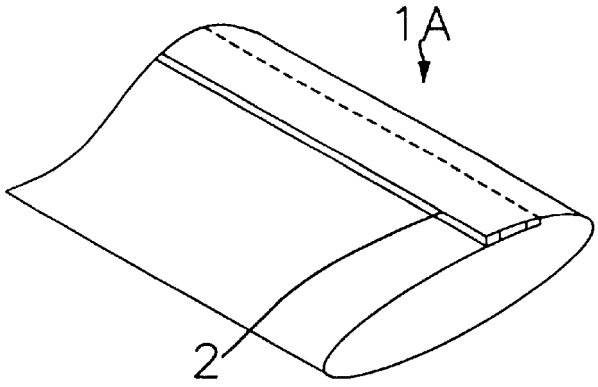
FIG. 10A is a perspective view depicting offsetting a first track.
Figure 10B:
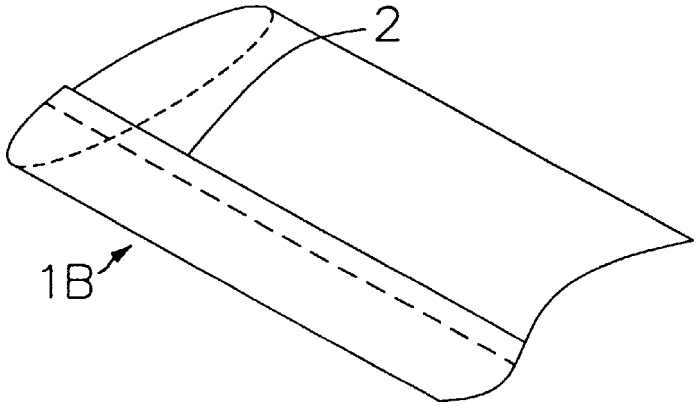
FIG. 10B is a perspective view depicting offsetting a second track.
Figure 11:
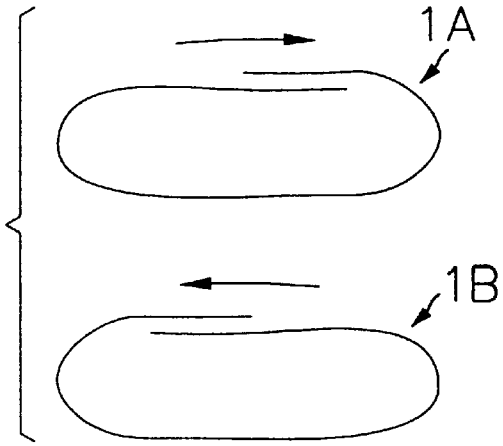
FIG. 11 is a side view of hoses 1a and 1b depicting their respective offsets.
Figure 12:
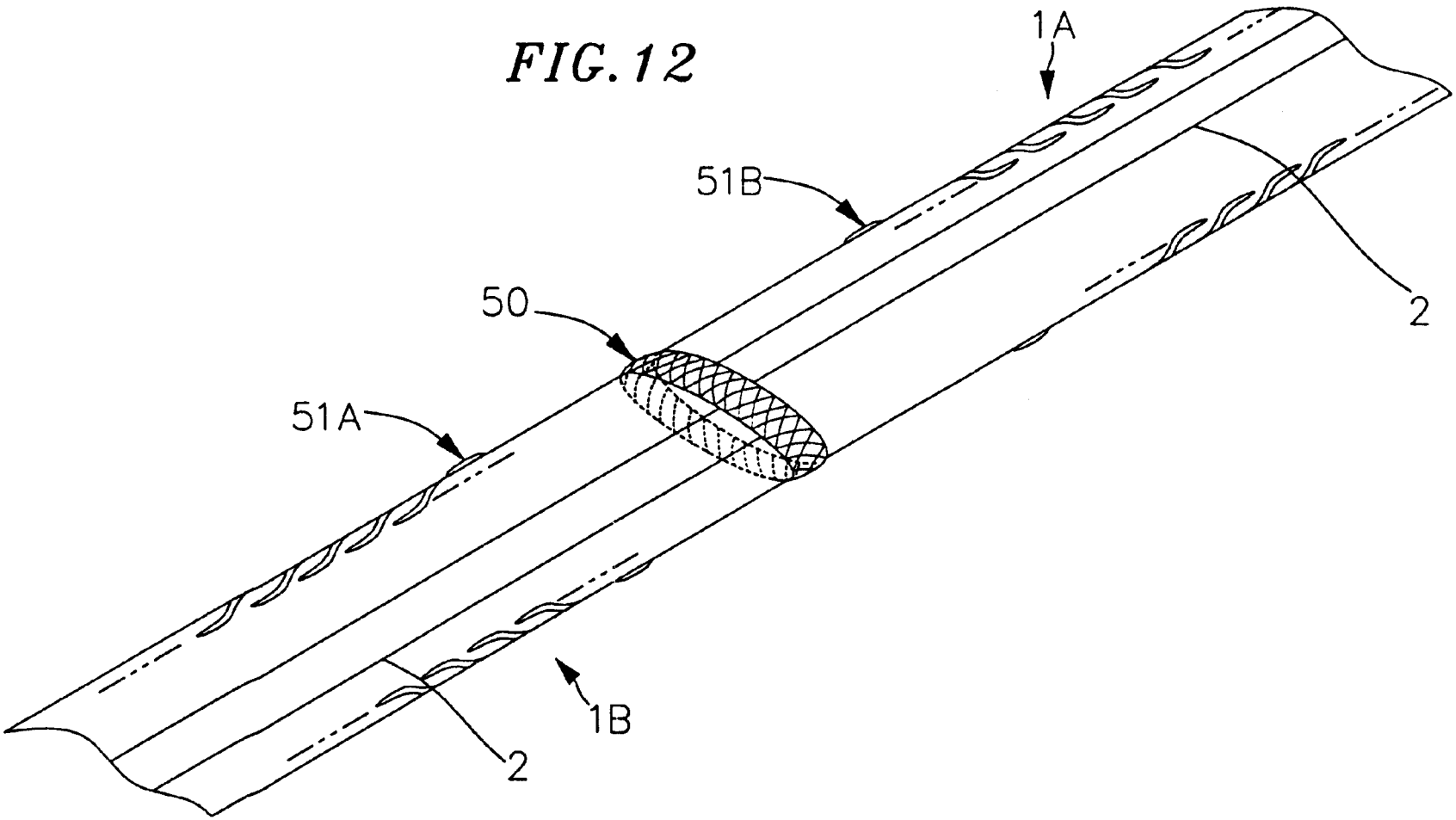
FIG. 12 is a plan view depicting offsetting a spliced pair of hoses.

In a further embodiment of the present invention, the track 2 of hoses 1a and 1b is offset, as shown in FIGS. 10A, 10B and 11. Offsetting simply means that the hose is refolded so that the track 2 no longer runs longitudinally but is skewed either to the left (FIG. 10A) or the right (FIG. 10B) such that the respective tracks do not overlap when the pair of hoses 1a and 1b are connected together. The purpose of offsetting each hose is to lower the energy and heat required to fuse the junction 40 by minimizing the number of layers of overlapping plastic film. The offsetting of each track 2 causes the spliced hoses to define a discontinuous track, as shown in FIG. 12.

The offsetting is performed in two steps, prior and subsequent to the forming of a splice. Before hoses 1a and 1b are heated to increase their pliability, each hose is offset by shifting the track to either the left or right and refolding the edges of the hose, preferably extending approximately 18" away from the cut end. The respective offsets of hoses 1a and 1b are shown in the side view depicted in FIG. 11. After the splice has been formed, each of the connected hoses 1 are again refolded at their edges, preferably extending about 12" away from the primary seal 50. Thus, each track 2 continues in its longitudinal orientation outward from the offset in a normal condition beginning about 12" from either side of the primary seal 50. The further embodiment is particularly of use with plastic films of 15 mil thickness.

While the invention has been particularly shown and described as referenced to the embodiment thereof, it will be understood by those skilled in the art that the foregoing and other changes in form and detail may be made therein without departing from the spirit and scope of the present invention.

What is claimed is:

1. A method for splicing together a pair of drip irrigation hoses using means for splicing internal to the pair of hoses, comprising the steps of:

joining the pair of hoses in axial alignment to form a junction with the splicing means interposed internal to each hose;

bonding the splicing means to a first circumferential portion of an inside surface of each hose to fashion the pair of hoses and splicing means into a unitary structure; and forming a seal using means for sealing circumferentially at the junction to create a water-tight seal wherein the splicing means prevents a second circumferential portion of the inside surfaces of the hoses opposite to the splicing means from bonding to said splicing means during the forming of the seal.

2. A method according to claim 1, wherein the step of joining further comprises overlapping the pair of hoses to form the junction.

3. A method according to claim 1, wherein the step of joining further comprises butting together ends of the pair of hoses to form the junction.

4. A method according to claim 1, wherein the step of joining further comprises adding material to form the junction.

5. A method according to claim 1, wherein the hoses define an irrigation track longitudinally along one wall of each hose and the splicing means is interposed on an inside surface of a wall opposite the track.

6. A method according to claim 1, wherein the step of bonding further comprises the steps of:

pressing the pair of hoses together using the fusing means around the junction; and fusing the splicing means to each hose using fusing means to cause the splicing means to bond with the inside surface of each hose.

7. A method according to claim 6, wherein the fusing means comprises a thermal impulse heat sealer.

8. A method according to claim 1, wherein the step of forming a seal further comprises the steps of:

fusing a bottom half of the junction using the sealing means; and fusing an upper half of the junction using the sealing means.

9. A method according to claim 8, wherein the sealing means comprises a thermal impulse heat sealer.

10. A method according to claim 1, further comprising the step of forming a pair of secondary seals parallel to either side of the circumferential seal and centered on an outer surface of each hose aligned with an end of the splicing means.

11. A method according to claim 10, wherein the secondary seals are formed on an underside of each hose.

12. A method for splicing together a pair of drip irrigation hoses using a splicing insert internal to the pair of the hoses, comprising the steps of:

preheating each hose;

inserting approximately half of the splicing insert into one hose;

connecting the pair of hoses by inserting the other half of the splicing insert into the other hose, the pair of hoses being axially aligned and forming a junction;

heating the pair of hoses around the junction to fuse the splicing insert to only a circumferential portion of an inside surface of each hose proximate the junction; and fusing the junction circumferentially to create a primary water-tight seal.

13. A method according to claim 12, wherein the pair of hoses define an irrigation track longitudinally along one wall of each hose and the splicing insert is fused to an inside surface of each hose on a wall opposite the track.

14. A method according to claim 13, wherein the step of connecting further comprises offsetting each track whereby the spliced hoses define a discontinuous track.

15. A method according to claim 12, wherein the splicing insert comprises a bonding surface, the method further comprising the step of folding the splicing insert transversely with a slight offset from center with the bonding surface facing inwardly to facilitate proper insertion of the splicing insert into a hose.

16. A method according to claim 12, wherein the connecting step further comprises the step of overlapping the pair of hoses to form the junction.

17. A method according to claim 12, wherein the step of connecting further comprises butting together ends of the pair of hoses to form the junction.

18. A method according to claim 12, wherein the step of connecting further comprises adding material to form the junction.

19. A method according to claim 12, further comprising the step of forming a pair of secondary seals parallel to the primary seal on an outer surface of the pair of hoses and centered over an end of the splicing insert.

20. A method according to claim 12, wherein a plurality of irrigation slits is formed longitudinally along one wall of each hose, the method further comprising the step of cutting each hose at a location approximately equidistant between a pair of the irrigation slits.

21. A method for splicing together a pair of drip irrigation hoses comprising the steps of:

inserting a first end of a splicing insert into an end of a collapsible first hose to be spliced;

inserting a second end of the splicing insert into an end of a collapsible second hose to be spliced;

bonding the insert to an inside surface of each hose;

collapsing the hose ends over the bonded insert by applying pressure over the hose ends; and heating the collapsed hose ends fusing the hose ends together creating a splice.

22. A method according to claim 21 wherein the splicing insert prevents the hoses from bonding shut when collapsed.

23. A method according to claim 21 wherein the splicing insert has only one activatable bondable surface and wherein the step of bonding further comprises the step of activating the bondable surface for bonding the splicing insert to the inside surface of each hose.

24. A method according to claim 23 wherein the bondable surface is heat activatable and the step of activating the bondable surface comprises the step of heating the bondable surface.

25. A method according to claim 23 wherein the step of activating the bondable surface comprises the step of applying pressure to the bondable surface.

26. A method according to claim 21 further comprising the step of centering the insert between the first and second hoses.

27. A method according to claim 26 wherein the splicing insert has a bondable surface and wherein the centering step comprises the steps of:

folding the insert on to itself, forming a crease dividing the insert into a first lower portion and a second upper portion wherein the first portion extends a predetermined distance beyond the second portion forming an offset;

unfolding the insert;

inserting the insert first portion into the end of the first hose, aligning the crease with the end of the first hose and positioning the bondable surface of the folded insert first portion to make contact with a lower surface of the first hose;

inserting the insert second portion into the end of the second hose; and sliding the end of the second hose over the end of the first hose overlapping the end of the first hose by a distance approximately equal to the predetermined distance of the offset.

28. A method according to claim 21 wherein the pair of hoses have an irrigation track longitudinally along a first wall of each hose and wherein the step of bonding comprising bonding the insert to an inner surface of a wall opposite the first wall.

29. A method according to claim 21 wherein each hose has outlets along its irrigation track, the method further comprising the step of cutting each hose perpendicularly to its longitudinal axis at a location centered between outlets forming the hose end to be spliced.

*30. A method for splicing together a pair of irrigation hoses comprising:*

*inserting a first end of a splicing insert into an end of a first hose to be spliced;*

*inserting a second end of the splicing insert into an end of a second hose to be spliced;*

*collapsing the hose ends over the insert by applying pressure over the hose ends; and*

*heating the collapsed hose ends fusing the hose ends together creating a splice wherein the insert prevents opposite points of a hose on either side of the insert from being bonded to each other.*

*31. A method as recited in claim 30 further comprising centering the insert between the first and second hoses.*

*32. A method according to claim 31 wherein the operation of centering comprises:*

*folding the insert on to itself, forming a crease dividing the insert into a first lower portion and a second upper portion wherein the first portion extends a predetermined distance beyond the second portion forming an offset;*

*unfolding the insert;*

*inserting the insert first portion into the end of the first hose, aligning the crease with the end of the first hose;*

*inserting the insert second portion into the end of the second hose; and*

*sliding the end of the second hose over the end of the first hose overlapping the end of the first hose by a distance approximately equal the predetermined distance of the offset.*

*33. A method as recited in claim 30 wherein the insert comprises a surface that does not bond to the hoses.*

*34. A method as recited in claim 30 further comprising passing water through the spliced hoses.*

*35. A method as recited in claim 30 wherein the splice is water tight splice.*

*36. A method for splicing together a pair of irrigation hoses comprising:*

*inserting a splicing insert into a splicing end of a first hose to be spliced;*

*placing the splicing end of the first hose within a splicing end of a second hose to be spliced forming an overlap section;*

*collapsing the overlap section causing the splicing end of the second hose to collapse over the splicing end of the first hose causing the splicing end of the first hose to collapse over the insert; and*

*heating the collapsed hose ends fusing the second hose splicing end to the first hose splicing end creating a splice wherein the insert prevents opposite points of the first hose from being bonded to each other.*

*37. A method as recited in claim 36 wherein the step of collapsing comprises the step of applying pressure to the outer surface of the second hose splicing end.*

*38. A method as recited in claim 36 wherein the insert comprises a non-bondable surface.*

*39. A method as recited in claim 36 further comprising the step of bonding a surface of the insert to an inner surface of the first hose splicing end.*

*40. A method as recited in claim 39 wherein the surface of the insert opposite the surface of the insert bonded to the inner surface of the first hose splicing end does not bond to any surface of the first hose splicing end.*

*41. A method as recited in claim 36 further comprising passing water through the spliced hoses.*

*42. A method as recited in claim 36 wherein the splice is water tight splice.*

*43. A method for splicing together a pair of hoses comprising:*

*folding a splicing insert onto itself, forming a crease dividing the insert into a first portion and a second portion wherein the first portion extends a predetermined distance beyond the second portion forming an offset;*

*unfolding the insert;*

*inserting the insert first portion into the end of the first hose, aligning the crease with the end of the first hose;*

*inserting the insert second portion into the end of the second hose; and*

*sliding the end of the second hose over the end of the first hose overlapping the end of the first hose by a distance approximately equal the predetermined distance of the offset;*

*collapsing the hose ends over the insert by applying pressure over the hose ends; and*

*heating the collapsed hose ends fusing the hose ends together creating a splice wherein the insert prevents opposite points of a hose on either side of the insert from being bonded to each other.*

* * * * *